Aug. 28, 1928.
F. W. HEWITT
1,682,337
AUTOMATIC COOKING
Filed Nov. 8, 1927      4 Sheets-Sheet 1
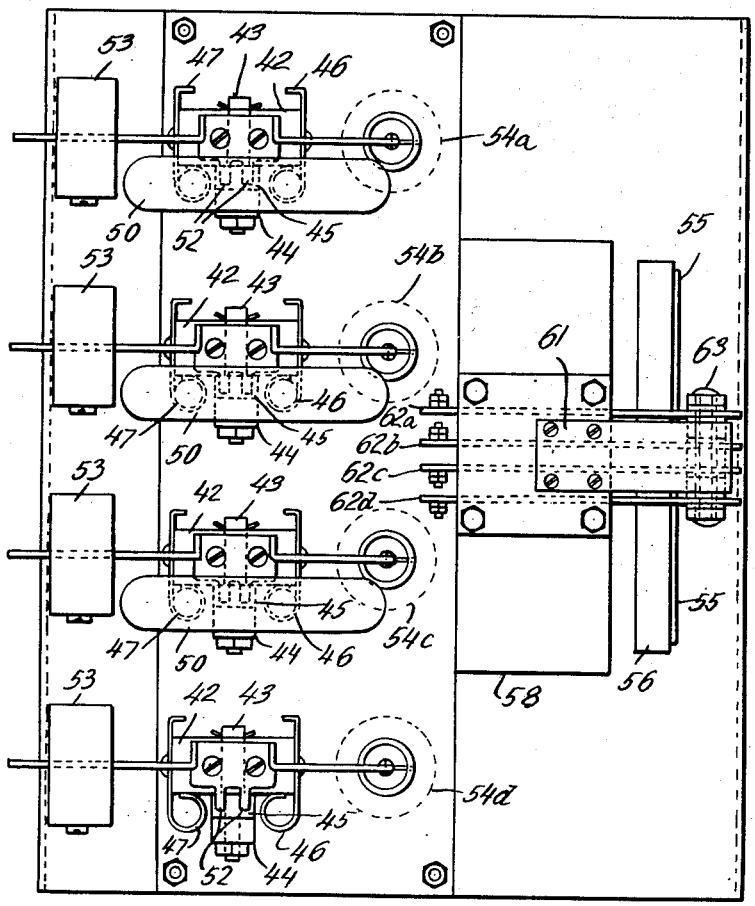
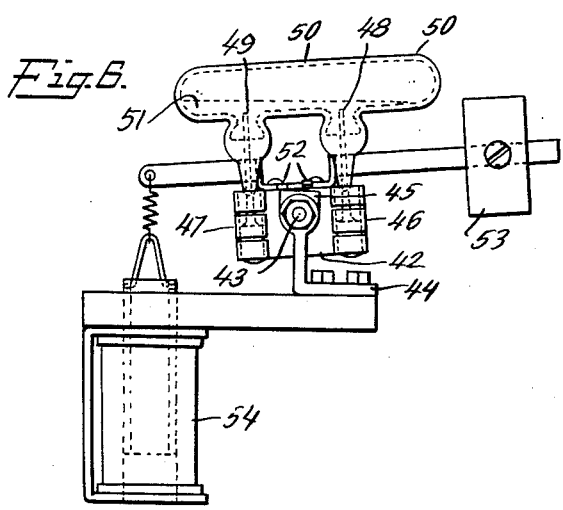
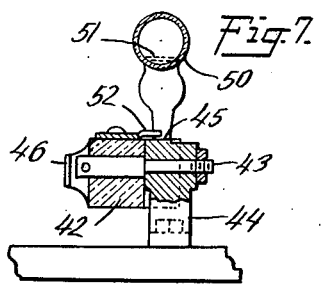
INVENTOR
Frank W. Hewitt
BY
ATTORNEYS

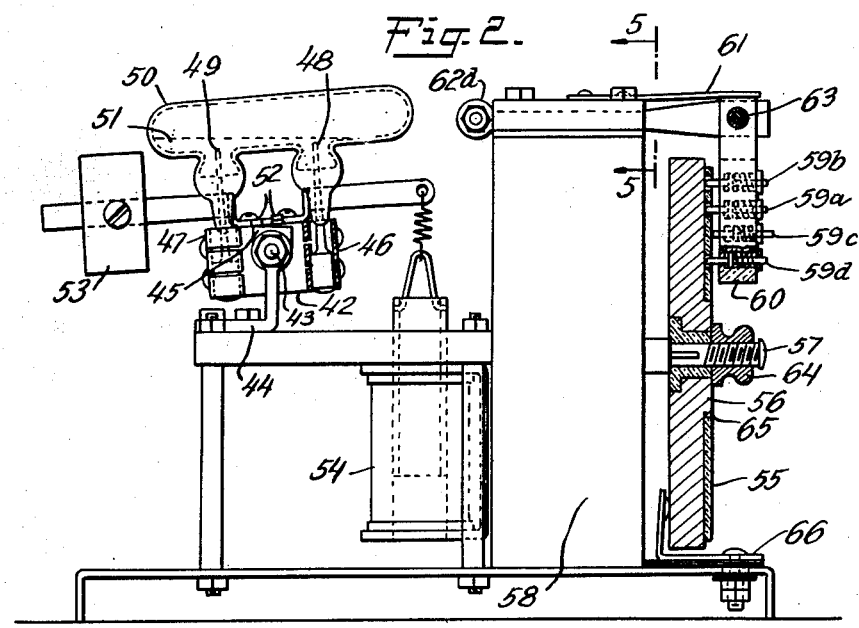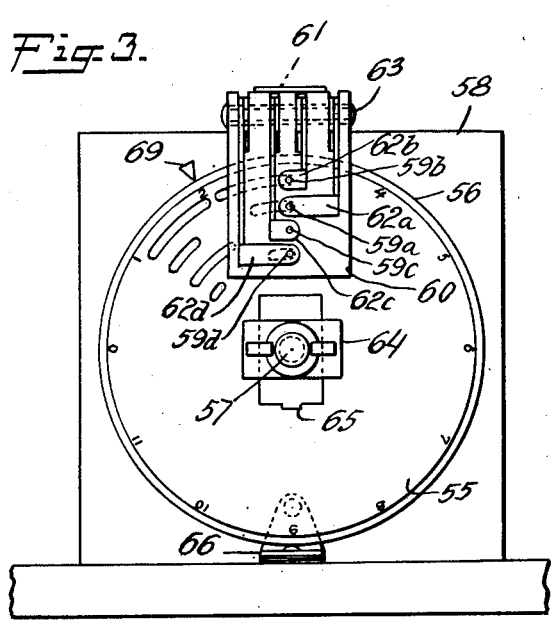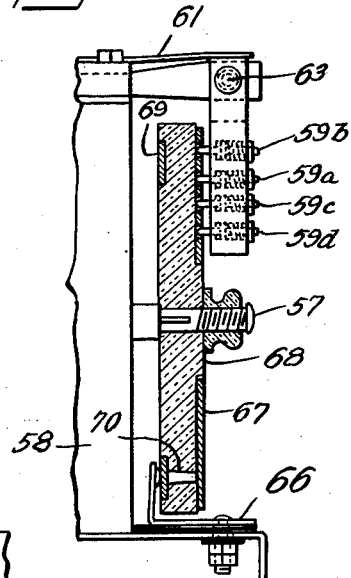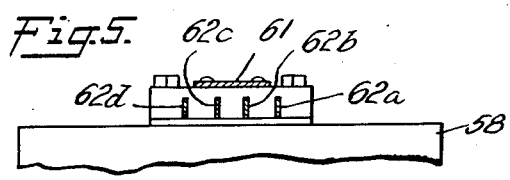

Aug. 28, 1928.
F. W. HEWITT
1,682,337
AUTOMATIC COOKING
Filed Nov. 8, 1927
4 Sheets-Sheet 3
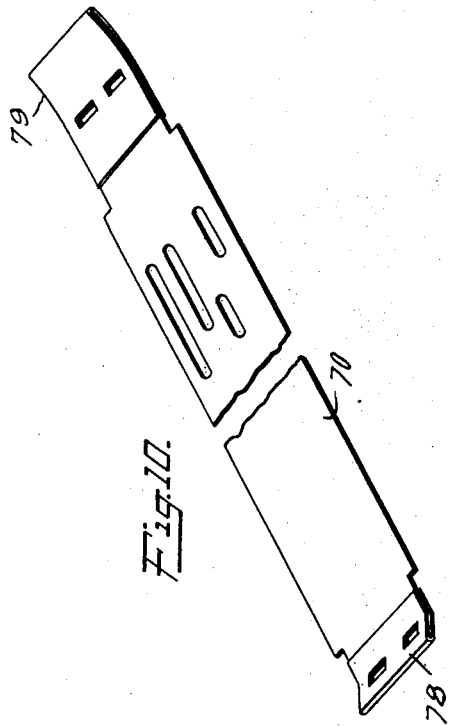
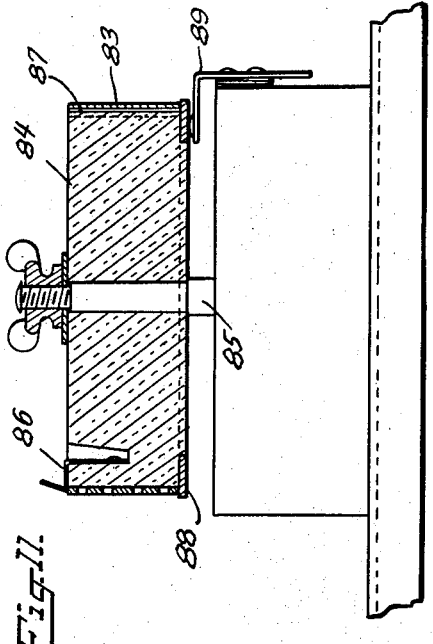
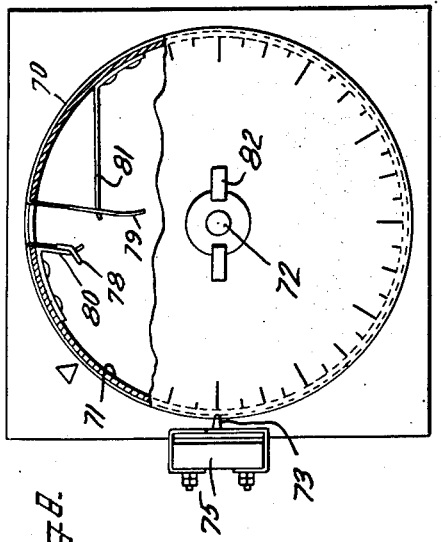
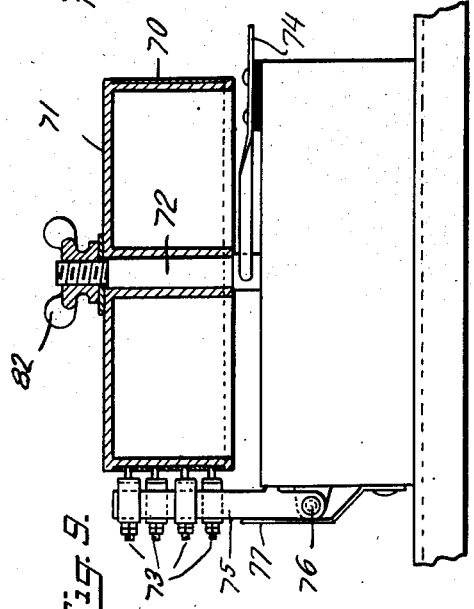
INVENTOR
Frank W. Hewitt
BY
Pennie, Davis, Marvin & Edmonds
ATTORNEYS Aug. 28, 1928.
F. W. HEWITT
1,682,337
AUTOMATIC COOKING
Filed Nov. 8, 1927    4 Sheets-Sheet 4
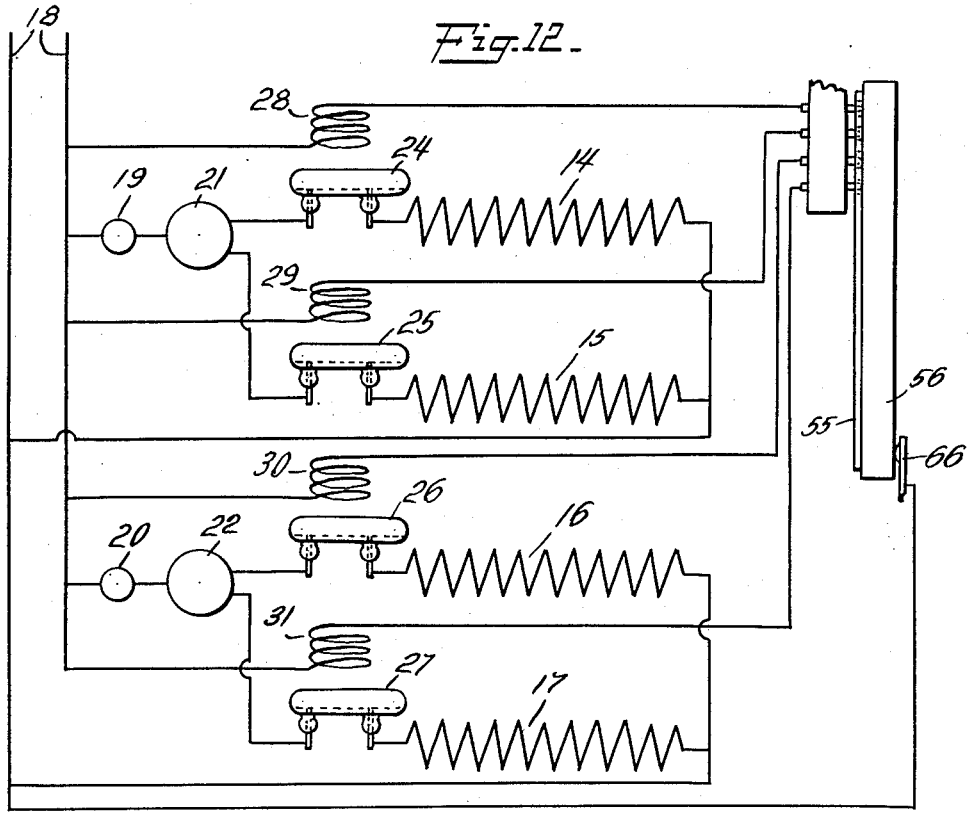
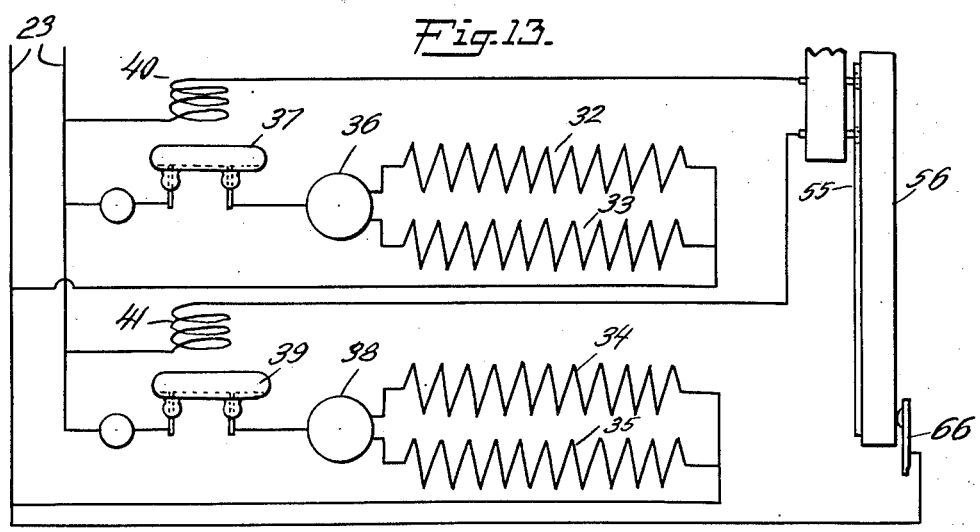
INVENTOR
Frank W. Hewitt
BY
Pennie, Davis, Marvin & Edmonds
ATTORNEYS Patented Aug. 28, 1928.

1,682,337

UNITED STATES PATENT OFFICE.

FRANK W. HEWITT, OF ARLINGTON, MASSACHUSETTS, ASSIGNOR, BY MESNE ASSIGNMENTS, TO BUCKWALTER STOVE COMPANY, OF ROYERSFORD, PENNSYLVANIA, A CORPORATION OF PENNSYLVANIA.

AUTOMATIC COOKING.

Application filed November 8, 1927. Serial No. 231,822.

This invention relates to improvements in cooking apparatus, and is directed more particularly to the provision of cooking apparatus more completely automatic in operation and more satisfactory from the standpoint of food preparation than any available up to this time.

Some cooking operations are of necessity quite simple requiring merely that the food be maintained within certain temperature limits for a certain period of time, but the number of instances in which food can be so cooked to best advantage is quite limited. Of course, cooking operations very frequently assume this simple character because of lack of skill or knowledge of the operator or because of the difficulty or attention required in carrying out the operation under more appropriate conditions. I refer particularly to cooking operations in which factors of temperature and time should be subjected to variable control during the operation to secure best results.

The optimum conditions for the preparation of roast beef, for example, were probably one of the earliest culinary discoveries. For best results, roast beef should be cooked initially at a relatively high temperature for a relatively short period of time and subsequently at a relatively low temperature for a relatively long period of time. This is true of roast meats in general; for example, such cooking operations are frequently carried out at temperatures of 500–550° F. for an initial period of from 15–25 minutes and then at temperatures of 350–450° F. for a subsequent period several times as long.

The roasting of meat is a comparatively simple example of the more complex type of cooking operation to which I refer above. Breads, cake and pastry represent another group of cooking operations in which the maintenance of optimum conditions may require considerably more complex adjustment of temperature and time factors during the operation.

Some steps have been taken in the past to secure more or less automatic control of cooking operations. In one type of apparatus, the cooking heater is arranged within an insulated receptacle, a clock mechanism is arranged to turn the heater on at a selected future time and a thermostat mechanism is arranged to turn the heater off when the temperature in the receptacle reaches a selected maximum value. This type of apparatus subjects the food being cooked to a sharp initial increase in temperature followed by a more or less gradual decline in temperature. In another type of apparatus, a clock mechanism is arranged to turn the cooking heater on and also off at selected future times and a thermostat is arranged to maintain a selected temperature during this period. This type of apparatus subjects the food being cooked to a sharp initial rise in temperature, to the same temperature for a definite period and then to a temperature declining at a rate more or less out of control of the operator. It will be apparent that the only conditions which can be maintained automatically in these two types of apparatus approach optimum conditions in but a limited number of cases.

In still another type of apparatus, a clock mechanism is arranged to turn the cooking heater on at some selected future time, to make an intermediate selected adjustment of the cooking heater during the operation, and to turn the cooking heater off at some further future selected time. This type of apparatus is useful in the simpler cases, but both the apparatus and the operation rapidly become involved to the point of uselessness with increase in complexity of the cooking operation. Moreover, many types of cooking operations are entirely outside of the scope of this type of automatic control.

The present invention provides an improved cooking apparatus which affords substantially complete automatic control of the cooking operation, which is nevertheless extremely simple to operate and quite simple in construction, and which at the same time makes possible the maintenance of optimum conditions throughout the most involved and most complex cooking operations.

In studying the operations of cooks chosen for their particular capabilities, I have observed that they go through a sequence of manual operations, these operations and the sequence of these operations being approximately the same in any particular case. This sequence of manual operations usually represent in summary the result of prolonged experience. Sometimes these cooks base their manual operations upon observations of time or temperature, but this is the exception rather than the rule. These manual operations also are frequently quite involved, for example, in making hot breads, some expert cooks will make four or five adjustments of oven heat during the operation. As a result of this study I have reached the conclusion that one satisfactory mode of automatic control would be secured by providing means for duplicating the sequence of manual operations, or at least the operating result of such sequence of manual operations, that a good cook would go through in any particular cooking operation.

This invention provides cooking apparatus which is of itself capable of duplicating automatically any operation that any cook could carry out manually with the same cooking apparatus. I thus secure completely automatic control of the cooking operation and at the same time make it possible to maintain optimum conditions throughout the cooking operation. From another standpoint, the invention makes available for everyone the accumulated experience of cooking experts without requiring technical skill. In fact, by making possible the duplication of any cook's best, the invention makes possible a better average performance than any human operator can attain.

The improved cooking apparatus of the present invention comprises a cooking heater, control means for turning the cooking heater on and off, a replaceable record of a specific cooking operation, a motor mechanism adapted to receive this record and to advance it as time progresses, and means cooperating with the record for actuating the control means for the heater.

By the provision of appropriate replaceable or interchangeable records of the specific operations it is desired to duplicate, any selected cooking operation can be carried out as a matter of choice simply by the substitution of the appropriate record. Although these records are severally replaceable or interchangeable, each individual record is in itself a fixed record of a particular cooking operation. In connection with the control actuating means, these records make possible the duplication automatically of any adjustment that could be made manually with the control means for the heater.

The motor mechanism in the apparatus of the invention, is not a timing device in the sense of starting or stopping some particular operating function. This motor mechanism serves simply to advance the record of the specific cooking operation under way as time progresses, this record being the factor of control in the operation. This motor mechanism may be clock operated, for example, by a spring driven clock or by an electrically operated clock such as those driven by small synchronous motors, or it may be operated by some means compensating for variations in the power supplied to the cooking heater by corresponding variation in the rate of advance of the record of the specific cooking operation under way.

The invention makes unnecessary the provision of thermostatic mechanism for controlling the cooking heater. As pointed out above, I have observed that cooking operations are usually carried out as a definite sequence of definite manual operations, and this invention makes possible the duplication of such sequence of manual operations independently of the temperature of the cooking heater, the automatic operation in this respect corresponding to the usual manual operation. Particularly from the standpoint of simplicity, I find it advantageous to eliminate any intervening thermostatic control and to actuate the control means for the heater directly by the record of the specific cooking operation under way without reference to heater temperature.

The invention will be further described in connection with the accompanying drawings which illustrate in some detail several forms of apparatus embodying the invention. It will be appreciated, however, that these drawings and this further more detailed description is intended in an illustrative rather than in a definitive sense. Referring to the drawings:

Fig. 1 is a plan view of a control mechanism embodying the invention,

Fig. 2 is an end view, partly in section, of this same mechanism,

Fig. 3 is a fragmentary elevation, at right angles to Fig. 2, of this same mechanism, Fig. 4 is a fragmentary detail of a modified form of the control mechanism illustrated in Figs. 1, 2 and 3, Fig. 5 is a fragmentary section on line 5—5 of Fig. 2, Fig. 6 is a detail of a modified form of relay switch, Fig. 7 is a fragmentary section of part of the relay mechanism illustrated in Figs. 1, 2 and 6, Fig. 8 is a plan view and Fig. 9 an elevation, partly in section, of another modified form of control mechanism, Fig. 10 illustrates one type of record employed in connection with control mechanism of the type illustrated in Figs. 8 and 9, Fig. 11 is an elevation, partly in section, similar to Fig. 9, of still another modified form of control mechanism, and Figs. 12 and 13 are circuit diagrams of electrical cooking apparatus embodying the invention.

The invention is embodied with particular advantage in electrical cooking apparatus and, for this reason, is described more particularly in connection therewith.

Referring to Fig. 12, the resistances 14, 15, 16 and 17 represent heating elements in an electric range to which power is supplied by means of mains 18. A fuse 19 is provided in the circuit with elements 14 and 15 and a fuse 20 in the circuit with elements 16 and 17. Likewise, switches 21 and 22 are provided for manual control of these same pairs of heating elements. Each of these switches is adapted to connect or disconnect either or both of the associated pair of heating elements with the power mains. For automatic operation, each of these switches 21 and 22 are left in a position such that both of the heating elements in each pair are connected to the power mains. Supplementing the switches 21 and 22 are a series of independent relay switches 24, 25, 26 and 27 connected separately in circuit with the heating elements 14, 15, 16 and 17 respectively. These relay switches are arranged to be actuated, that is, to close or open the circuit through the connected heating elements, by means of the solenoids 28, 29, 30 and 31. By controlling these solenoids, the flow of current through the several heating elements is independently controlled, and, in the apparatus of the invention, these solenoids are arranged to be energized or de-energized by a record of the specific cooking operation to be carried out operating to open and close, or vice versa, the circuits through the solenoids as the cooking operation progresses. By these means, any cooking operation which might be carried out with manual control of switches 21 and 22 can be duplicated by means of automatic control through relay switches 24, 25, 26 and 27.

The apparatus diagramed in Fig. 13 is somewhat more simple, somewhat less flexible and somewhat less automatic than the apparatus diagramed in Fig. 12, but this apparatus also embodies certain features of the invention. Resistances 32, 33, 34 and 35 represent heating elements in an electric range to which power is supplied by means of mains 23. Instead of providing a separate relay switch for each of the heating elements as in the apparatus diagramed in Fig. 12, a single relay switch is provided for each pair of heating elements in the apparatus diagramed in Fig. 13. The relay switches thus provide for automatic control during operation, but this arrangement of apparatus requires a manual selection of the heating element or elements to be connected in the circuit before the cooking operation begins. Thus, by means of switch 36, either or both of the heating elements 32 and 33 may be connected in circuit with the relay switch 37. The selection, that is the setting of switches 36 and 38, to be made in any particular case may be indicated, for example, on the face of the record. The relay switches 37 and 39 are actuated by means of solenoids 40 and 41 in circuits controlled by a record of the specific cooking operation to be carried out, as described in connection with the apparatus diagramed in Fig. 12.

Suitable forms of records and record driving mechanism are described below, this portion of the apparatus being illustrated diagrammatically at the upper right hand side of Figs. 12 and 13. Suitable forms of relay mechanisms are also described below.

I have found the type of relay mechanism illustrated in Figs. 1, 2, 6 and 7 to be particularly adapted to the conditions encountered in the automatic operation of electrical cooking apparatus.

This relay mechanism comprises a block 42 of insulating material pivoted on a pin 43 carried in a support 44 having a shoulder 45. Block 42 carries socket members 46 and 47 adapted to receive extensions of electrodes 48 and 49 arranged within a fused quartz closed tube 50 partly filled with mercury 51 and shaped so that an electrical circuit is completed or broken between the electrodes according to the position of the tube. In Fig. 1, one of the relay mechanisms is shown with the tube removed from the sockets receiving the electrode extensions. The socket members 46 and 47 are connected to the associated heating element and the power mains by means of suitable flexible leads. The extreme positions of the tube 50 are limited by the stops 52 which cooperate with shoulder 45. In the relay mechanism illustrated in Fig. 2, the tube is normally held in the closed circuit position by means of the counter weight 53 but is held in the open circuit position when the solenoid 54 is energized. In the relay mechanism illustrated in Fig. 6, the tube 50 is normally held in the open circuit position by means of the counter weight 53 but is held in the closed circuit position when the solenoid 54 is energized. In both Figs. 2 and 6 the tube is shown in the closed circuit position; in the open circuit position the tube is tilted so that the mercury therein runs to one end of the tube leaving one of the electrodes out of contact with the mercury.

In apparatus of the type diagramed in Figs. 12 and 13, the record of the specific cooking operation to be carried out operates by opening and closing the circuit through the solenoids actuating the relay switches in the heating element circuits. The exact form of these records is not important as long as they are accurate and reliable in governing the operation of the relay actuating circuits. These records, for example, may consist of insulating material upon a conducting back with apertures through the insulating material operating to close the relay contact circuits between contact members and the conducting back as these apertures pass beneath the contact members, or they may consist of conducting material upon an insulating back with apertures through the conducting material operating to open the circuit through contact members as these apertures pass beneath the contact members.

In the apparatus illustrated in Figs. 1, 2 and 3, the record of the cooking operation to be carried out consists of a disk 55 of insulating material carried by a platen 56 of conducting material mounted on a shaft 57 driven by suitable motor mechanism within the casing 58. This motor mechanism is arranged to rotate the shaft 57 in a clockwise direction, facing Fig. 3, one revolution in 12 hours. This particular speed of rotation is given as an example because it is a convenient speed, most cooking operations, even most postponed cooking operations, being completed within that period. The speed of rotation may of course be varied, it being necessary only that the record used correspond to the speed of rotation. The circuits through the several solenoids 54$^a$, 54$^b$, 54$^c$ and 54$^d$ are controlled by the contact pins 59$^a$, 59$^b$, 59$^c$ and 59$^d$ respectively, (electrical connections not shown in Figs. 1, 2 and 3). These contact pins are carried in a pivoted block 60 of insulating material which can be raised to permit the ready replacement of records on the platen 56. The block 60 is held in operating position by means of spring 61. Connections to the contact pins 59, 59$^d$ are made through the conducting elements 62$^a$—62$^d$ which are hinged about the pivot 63 on which the block 60 is mounted. The record 55 is held in place on the platen 56 by means of the nut 64 moving on a relatively steep left-hand thread on the shaft 57. By making this nut of the shape illustrated and by making the shaft on the shaft 51 of a suitable pitch, the record can be clamped in place by approximately one-quarter turn of the clamping nuts 64. The face of the platen 56 is arranged to form a key member 65 to hold the replaceable or interchangeable records in a definitely fixed position when mounted thereon. The control circuits through the solenoids 54$^a$—54$^d$ are completed through the member 66 which makes contact with the conducting platen 56.

The apparatus illustrated in Fig. 4 differs from that illustrated in Figs. 1, 2 and 3 principally in that the record 61, instead of being of insulating material, is of conducting material and is mounted upon a platen 68 of insulating material. The control circuits through the record 67 are completed through a ring 69 of conducting material mounted on the back of the platen and connected to the record by pins 70 of conducting material extending from this ring through the platen at suitable intervals, this ring 69 in turn contacting with the contact member 66. The relay control circuits in apparatus of the type illustrated in Figs. 1, 2 and 3, or 4, may operate either normally in closed circuit or normally in open circuit, and, similarly, the relay switches may be arranged either to close the heater circuits when the relay solenoids are energized or to open the heater circuits when the relay solenoids are energized.

The motor mechanism driving the shaft 57 may consist, for example, of a spring driven clock or a synchronous motor driven clock mechanism or of an electric motor adapted to increase and decrease its speed respectively with increase and decrease in the voltage across the supply means to the heating elements. Where the shaft is driven by an electric motor, a friction clutch is interposed between the driving means and the shaft to permit setting of the platen and the record mounted thereon in a position such that the cooking operation will be completed at the desired selected time. A spring driven clock work may similarly be connected to the shaft 57 and wound by a separate key, or such clock work may be arranged to be wound by reverse rotation of the platen 56 to a point including from the zero position at least a period of time sufficient to allow for completion of the cooking operation.

One very convenient arrangement of the motor mechanism is illustrated in Fig. 3. An indicator 69 is mounted on the casing housing the motor mechanism driving the platen 56. Hours, or any desired division of time, are marked upon the edges of the record so that the zero time corresponds to the position of the record upon completion of the cooking operation. Thus, after placing the selected record upon the platen and clamping it in place, by turning the platen counterclockwise until the indicator is opposite the number of hours, or time division, indicating elapsed time at the end of which the cooking operation is to be completed, assuming this period is at least that required for the cooking operation, the control mechanism not only makes the cooking operation automatic but also automatically postpones the beginning of the operation that amount of time is necessary to have the operation just completed at the selected future time. A separate timing mechanism may also be provided to put the motor mechanism driving the record of the cooling operation to be carried out in operation at some selected future time.

Figs. 8 and 9 illustrate a modified form of record, record mounting and motor mechanism, the complete apparatus including a series of relays as illustrated in Fig. 1 in addition to the particular elements illustrated. In this apparatus, the record 70 of flexible insulating material is mounted in a recess in the face of a cylindrical platen 71 of conducting material carried on a shaft 72 driven by a suitable motor mechanism as described above.

The control circuit through the solenoid of each of the relays passes through one of the contact pins 73 to the platen 71 then to the shaft 72 and in turn through the contact member 74. The contact pin 73 is carried by block 75 of insulating material mounted upon a pivot 76 and held in normal operating position by a spring 77. The record 70 is in the form of a strip mounted between two clip members 78 and 79 adapted to be secured by two spring clips 80 and 81 respectively within the platen 71. To facilitate replacement of the record 70, the entire platen may be slipped from the shaft 72 by loosening the clamp nut 82.

In this general type of apparatus, also, the platen may be of insulating material and the record of conducting material, as illustrated in Fig. 11. In this form of apparatus, the record consists, for example, of a metallic cylinder 83, mounted upon an insulating platen 84 which is in turn carried by the shaft 85 driven by the motor mechanism. The record is held in fixed position on the platen by spring clip 86 and key 87 and rests upon a ring 88 of conducting material with which member 89 contacts for completing the control circuit.

Again referring to Fig. 12, for example, the heating elements 14 and 15 may be the top heating elements in an electric oven and the heating elements 16 and 17 the bottom heating elements in the same oven, the relay switches 24—27 may be the series of relay switches illustrated in Figs. 1–3, the solenoids 28—31 may be the relay solenoids 54ª—54ᵈ illustrated in Figs. 1–3, and the record and the motor mechanism and the contact mechanism cooperating with the record may be of the type illustrated in Figs. 1–3, or in Figs. 4, 8 and 9 or 11. In this apparatus, each of the several heating elements in the oven is independently controlled by the series of independent relay switches actuated through the corresponding series of relay solenoids by the operation of the record driven by the motor mechanism. By proper formation of the record used in any particular case, each of the several relay control circuits can be opened or closed, or vice versa, any required number of times and at regular or irregular intervals and each of the several control circuits can be so operated entirely independently of the others. The heating elements in the oven thus can be turned on and off at the same time or at different times or each of these heating elements can be turned on and off any required number of times, each independently of the others, making possible automatic duplication during the cooking operation of any sequence of operations that might be effected manually by means of switches 21 and 22. In this instance, as an illustration, the invention thus provides for complete automatic operation of the electric oven with a range of flexibility unapproached in any automatic cooking apparatus available up to this time. This range of flexibility in operation, cooperating with the completely automatic character of the operation, makes it possible to prepare foods under optimum conditions, without requiring any special skill or knowledge and without involving any difficulty or attention on the part of the operator.

The invention provides as well for automatic control of a plurality of heating operations as for automatic control of a plurality of heating elements utilized in a single operation as in the example just given. Again referring to Fig. 12, for example, each of the two pairs of heating elements there diagramed may be arranged in separate heaters in an electric range. In this aspect, the invention provides not only automatic control of a single cooking operation but also combined automatic control of a plurality of cooking operations and makes it possible, for example, automatically to complete several independent cooking operations at the same time each of which is in turn automatically controlled.

While the invention is of special value and application in connection with electrical cooking apparatus, it is also useful, in certain aspects, in connection with cooking operations in which heat is supplied otherwise than electrically, for example, by means of gas burners. In gas heated cooking apparatus, for example, the relay switches may be replaced with valves in burner gas lines, these valves similarly being actuated by solenoids or other electrically operated control mechanism, suitable pilot burners or other igniting devices being provided for the gas burners.

I claim:

1. In combination in cooking apparatus, a heater, control means therefor, a motor mechanism, a replaceable record of a specific cooking operation receivable and driven by said motor mechanism, and means cooperating with said record for actuating said control means directly and independently of heater temperature.

2. In combination in cooking apparatus, a plurality of heating elements, independent control means for each of said heating elements, a motor mechanism, a replaceable record of a specific cooking operation receivable and driven by said motor mechanism, and means cooperating with said record adapted for actuating said several control means.

3. In combination in electric cooking apparatus, an electric heating element, a motor mechanism, a replaceable record of a specific cooking operation receivable and driven by said motor mechanism, and means cooperating with said record for closing and opening the circuit through said heating element independently of the temperature of the heating element.

4. In combination in electric cooking apparatus, an electric heating element, a relay for closing and opening the circuit through the heating element independently of the temperature thereof, a motor mechanism, a replaceable record of a specific cooking operation receivable and driven by said motor mechanism, and means cooperating with said record for directly actuating said relay.

5. In combination in electric cooking apparatus, a plurality of electric heating elements, independent relays for closing and opening the circuit through each of said heating elements independently of the temperatures thereof, a motor mechanism, a replaceable record of a specific cooking operation receivable and driven by said motor mechanism, and means cooperating with said record for independently actuating said several relays.

6. In combination in electric cooking apparatus, an eletric heating element, a motor mechanism adapted to increase and decrease its speed of operation respectively with increase and decrease in voltage across the electric heating element, a replaceable record of a specific cooking operation receivable and driven by said motor mechanism, and means cooperating with said record adapted to close and open the circuit through said heating element.

In testimony whereof I affix my signature.

FRANK W. HEWITT.